United States Patent Office 3,806,394
Patented Apr. 23, 1974

3,806,394
WEB FORMING MACHINE
Raymond N. Davis, 700 Florida Ave., Clearwater, Fla. 33516
Filed Feb. 23, 1972, Ser. No. 228,715
Int. Cl. B32b *3/04*
U.S. Cl. 156—475
20 Claims

ABSTRACT OF THE DISCLOSURE

A web forming machine comprising an endless conveyor movably mounted on a supporting frame and a plurality of carriages mounted on the conveyor in spaced relation to one another and including oppositely disposed forming heads. The forming heads each comprise a pair of reciprocating, rotatable arms used to preform portions of the web into a desired configuration wherein each carriage carries the preformed web portions into working relation with work stations arranged in predetermined relation along the path of travel of the carriages. The plurality of work stations are each designed to carry on a different formation process on the web including positioning, forming feeding and metering, cutoff, fastening and removal of the web from the work line.

BACKGROUND OF THE INVENTION

Field of the invention

This invention relates to a machine for automatically forming various portions of flexible webs and include a conveyor means defining one or more assembly or work lines by means of a plurality of carriages which preform the web and carry it to a plurality of spaced apart work stations arranged adjacent to the path of travel of the carriages and in working communication with the web being carried thereon.

For many years it has been generally recognized that the application of mass production techniques for the production of almost every type of product is greatly advantageous both from an economic and quality control standpoint. There is of course a large number of products which are relatively inexpensive when sold to the ultimate consumer thereby making the profit margin small. In this type of product it is necessary for the manufacturer to utilize the most efficient, time saving and inexpensive means of manufacturing.

In the production of various articles of manufacture including furniture such as lawn chairs, deck chairs and the like, the use of nylon, plastic or other synthetic material has become popular. This type of furniture is generally considered to be inexpensive while at the same time comfortable and long lasting in any type of weather or adverse environment. In recent years the popularity of this type of product has of course led to its increased manufacture and an investigation into more efficient manufacturing techniques by the producers of this type of product. Again, as stated above, efficient and economic production methods is a prerequisite to producing this type of furniture at a profit.

Along these lines there is a recognized need in the industry to apply mass production techniques to the formation of the individual flexible strips or webs forming this type of furniture. Previously web formation of these type of strips was done by hand or by relatively crude, inefficient and inaccurate machines.

In the preforming of these webs, problems has arisen in the industry due primarily to the inherent difficulty in handling the product and also the relative accuracy required for proper installation of the web on the furniture frame or the like.

Accordingly, there is a recognized need in the web forming industry for machines which automatically, economically and accurately preform webs of various material to predetermined dimensions and which preform other needed manufacturing steps on the particular webs to allow them to be easily and accurately attached to a supporting frame. Such a machine should of course be automatic in operation and capable of being operated by few if any personnel. In addition such machine should have the flexibility of being able to perform numerous and varied work functions on a given web portion, dependent upon the particular application of the web being formed.

SUMMARY OF THE INVENTION

This invention relates to a web forming machine of the type designed to perform various work functions on a flexible web made from nylon, plastic, synthetic or a wide variety of other materials. While the present invention will be described with relation to the work function performed on a synthetic web material used in the production of lawn chairs or the like, it is obvious that various other webs of differing dimensions could be produced or formed as desired utilizing the machine of the present invention.

More particularly the present web forming machine comprises a support frame having movably mounted thereon a conveyor assembly designed to move in a continuous loop such that, ideally, more than one work line may be established on various sections of the loop. It should of course be noted that such a conveyor system could be arranged to have a single work line formed thereon.

A plurality of carriages are formed on the conveyor to move along their width wherein the carriages are arranged in spaced relationship to one another dependent upon the work function to be performed on the various portions of the web, the distance between various work stations arranged along the work line and the intended movement of the conveyor drive means. Each of the carriages comprises one or more forming heads. When two forming heads are arranged on the same carriage they are arranged in opposed spaced relation to one another wherein each head performs the same function on opposite extremities of different webbed portions. More particularly each head comprises a pair of arms angularly oriented relative to one another such that corresponding extremities of the arm may be extended outwardly to an area where the extremities almost intersect and where these extremities engage the web being worked on. Web forming members in the form of flanges or wings are attached adjacent to the ends of the reciprocating arms and are specifically configured to correspond to a predetermined portion of the extremity of the web to be formed.

Clamping means are mounted on each carriage so as to secure the web being worked on securely on the carriage. Cutting means in the form of a heat element is positioned adjacent the path of travel of the web at one of the plurality of work station which may be referred to as the cutoff station. This cutting element includes a heated member which when in engaging the web causes it to sever and thereby create substantially two free ends of the web portion associated with each of the carriages. After severing, rotation of the arms occurs in a successively predetermined relation such that each corner of each end of the web portion which has just been severed are folded underneath a support plate located adjacent the area of intersection of the arm extremities.

Rotation of the arm is caused by a gear assembly interconnected to the arms and to a first cam follower means. Each of the first cam follower means associated with each of the arms is positioned to engage a predetermined located cam so as to rotate the arms at a pre-established time and in a pre-established sequence.

Return of each arm also occurs successively and is activated by a second cam follower means being attached to the arm and positioned to engage a second cam means also constructed of a predetermined configuration to regulate the return, reciprocal movement of the individual arm members. It should be noted that while both corners of the free end of the web portions associated with each carriage are folded underneath the remainder of the web portion by separate forming members. When in this position the forming members are in overlapping relation and at least one of them is first withdrawn into a return, non-operated position. Because of the overlapping relationship of the folded corners and the single remaining forming member, the corners are maintained in this folded position until they reach the fastening means.

The fastening means comprises one of the plurality of work stations located adjacent to the path of travel of the web and carriages. This work station may take the form of a conventional staple machine wherein feeding means for the staples or other like fasteners comprises a vibratory hopper being fed individually to the stirrup and anvil of the staple or rivet machine by a delivery tube or the like. The single remaining web forming member which is attached on the arm is apertured such that the stirrup and anvil puncturing the folded portion of the free web end may extend through the aperture and securely fasten the preformed web in the desired configuration.

The plurality of work stations arranged along a work line on the conveyor further includes at least one feed station comprising a metering member. This metering member includes a plunger means which is positioned substantially above the path of travel of the web and when the adjacently positioned carriages are properly located and their associated clamp means are in operative position, the plunger is activated so as to engage the web. The stroke of the plunger or the amount it extends beyond the plane of the path of travel of the web is variable such that the amount of web fed from a web supply may be varied according to the particular application for which the web is to be used.

Located downstream of the other work stations mentioned above and any other station applicable to the formation of a given web for a given application, is a removal station. This removal station can be accomplished by hand or alternately may be automated by a depressing plunger means which may be located between adjacent carriages such that depression of the middle of a given web portion associated with two carriages removes the web portion from each carriage when the clamping means are in their non-web securing position.

In operation, a supply station in the form of a supply roll is located at one end of the conveyor and web from the supply roll is strung along the path of travel of the carriages. Because the web is attached to various in-line carriages, it is relatively taut and accordingly the carriage next passing into the work line essentially slides onto the web and positions it in a central in-line position relative to the longitudinal axis of the carriage. The driving means connected to the conveyor moves the conveyor and accordingly the carriage is mounted thereon in intermittent fashion such that each carriage is essentially indexed into position of the various in line work station arranged along the work line defined by the path of travel of the carriages.

After the carriage enters the work line and engages the web it next passes through the first portion of a forming station. This forming station comprises one of the plurality of work stations and includes reciprocating means in the form of piston and cylinder arrangements mounted on the supporting frame of the device and positioned to operatively engage the non-working extremity of each arm so as to force the arm into an outwardly extending, web engaging position. While the carriage is in this position and prior to the arm being extended into working engagement with the prior, adjacent carriage has its clamping means activated so as to movably secure the web to the prior adjacent carriage. When so secured, the metering means is actuated whereby web is fed from the supply roll till the predetermined amount is metered out therefrom. After this metering, the clamp means of the adjacent, subsequent carriage secures the web thereto and the carriages proceed in an indexing manner to the in line arranged work stations. At the various work stations work functions which include cutoff, forming, fastening and removal all occur. Again, it should be noted that due to the particular configuration of the conveyor means more than one work line may be defined by a line of carriages and the associated path of travel of the web which may travel in the same or different direction.

This invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawing in which.

Similar reference characters refer to similar parts throughout the several views of the drawings.

DETAILED DESCRIPTION

Figures 1, 2, 4, 6:
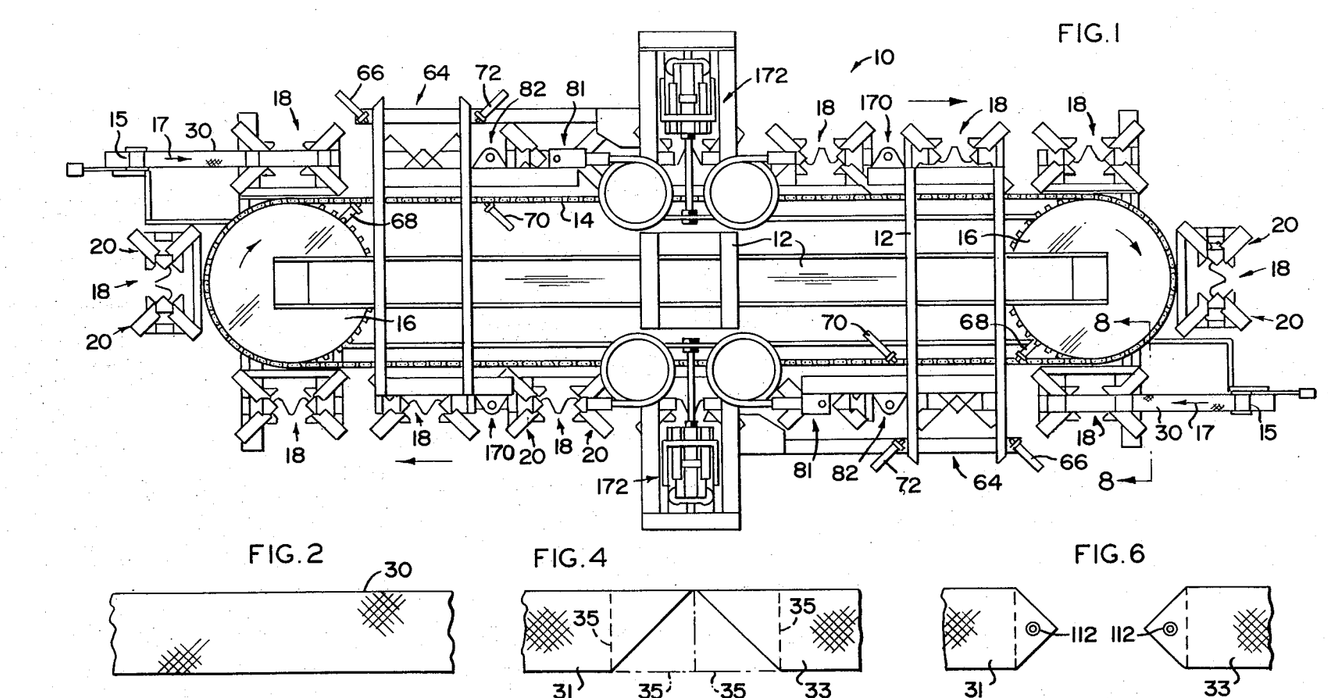
FIG. 1 is a top plan view of the web forming machine of the present invention comprising two work lines traveling in opposite directions.
FIGS. 2–7 show the various steps of web formation of the web portions associated with a single carriage and opposed end line forming heads.

This invention relates to an automatic web forming machine generally indicated in FIG. 1 as 10. The machine or device comprises a supporting frame 12 having an endless conveyor assembly movably mounted thereon. This conveyor assembly comprises a movable conveyor 14 which may be in the form of one or more continuous chains mounted on driving wheels or drums 16 located at each end of the conveyor path. The driving drum are powered by an applicable power source which drives the conveyor in an intermittent, steplike fashion. The purpose of the intermittent movement will be described hereinafter with particular reference to the remaining structure of the device. However, depending on the particular web being formed and the work processes formed thereon it is within the scope of the invention to provide the conveyor with a continuous uninterrupted motion.

Fixedly mounted on conveyor 14 are a plurality of carriages each generally indicated as 18 in FIG. 1. Each carriage is connected to the conveyor in spaced relation to one another a predetermined distance dependent on the function and location of various work stations arranged along and partially defining along with the path of travel in the web and carriage, a work line.

Figure 13:
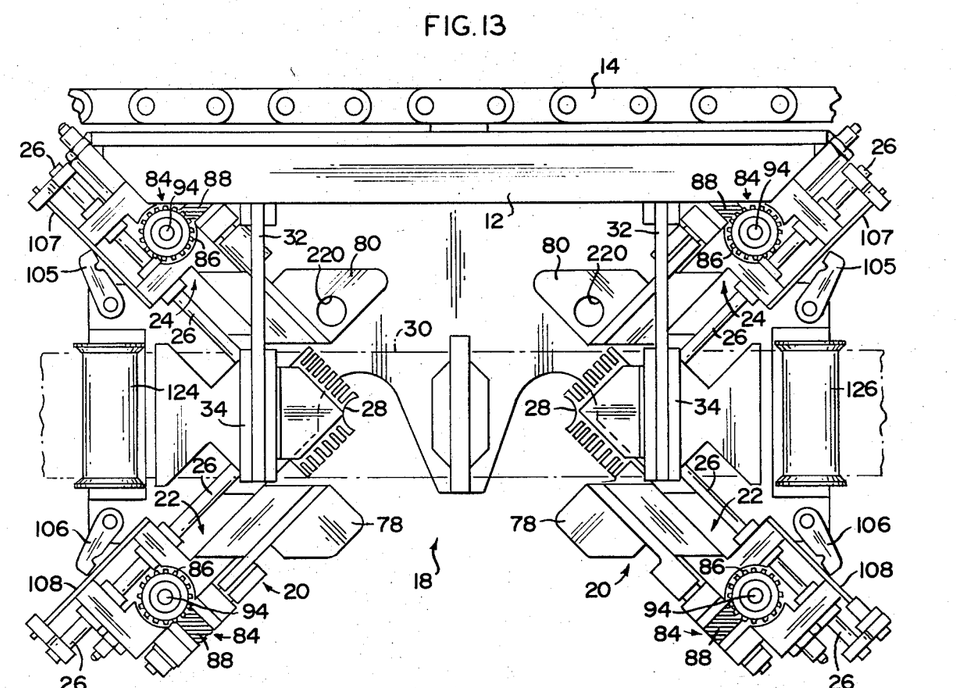
FIG. 13 is a top plan view of the carriage structure including oppositely arranged forming heads.

In the preferred embodiment shown, each of the carriages 18 includes a pair of forming heads each generally indicated as 20 (FIG. 13). Each forming head comprises a pair of arms 22 and 24 arranged in substantially angular orientation to one another and capable of being reciprocated and rotated about a shaft 26. This reciprocation and rotation of each arm will be explained in greater detail hereinafter with specific relation to the operative engagement with and forming of a desired web portion, respectively. The carriage further includes a pressure plate 28 positioned adjacent to the area of intersection or junction where the corresponding working extremity of each arm 22 and 24 meet when in operative position relative to the web portion being formed. When a web 30 is operatively positioned on a carriage it is aligned relative to the pressure plate 28 and arms 22 and 24 such that it is overlying relation to plate 28 and beneath the extremities of the arms in a sandwiched-like fashion (see FIG. 14).

The carriage further includes clamping means comprising one or more clamping arms 32 having clamping heads 34 attached to the outer extremity of each clamping arm wherein the clamping heads are configured to extend substantially across the width of web 30 and when in clamping position relative to the web, the web is secured in an immovable relation to the carriage 18 and pressure plate 28 in particular. This clamping means is best disclosed in FIGS. 8 and 11 wherein each clamp arm 32 is arranged to pivot about shaft 36 attached by spring 38 to an immovable portion of the carriage. An additional biasing spring 40 serves to normally bias the clamping arm 32 and accordingly head 34 upwardly against its downward travel by means of spring 40 being interconnected between clamp arm 32 at 42 and at its opposite end to frame portion 44. The clamp means may be secured in its clamping position relative to the web 30 by means of a clamp latch 46 designed to pivot about shaft 48 and being connected to carriage 18 by means of a third biasing spring 50. A hydraulic and pneumatic cylinder and piston arrangement is positioned immediately below the inner extremity 52 of the clamp arm 32 and comprises a cylinder 54 and piston 56 fixed to the frame. By virtue of this arrangement the clamping means can be controlled to selectively clamp the web to the carriage 18 as desired.

Figure 8:
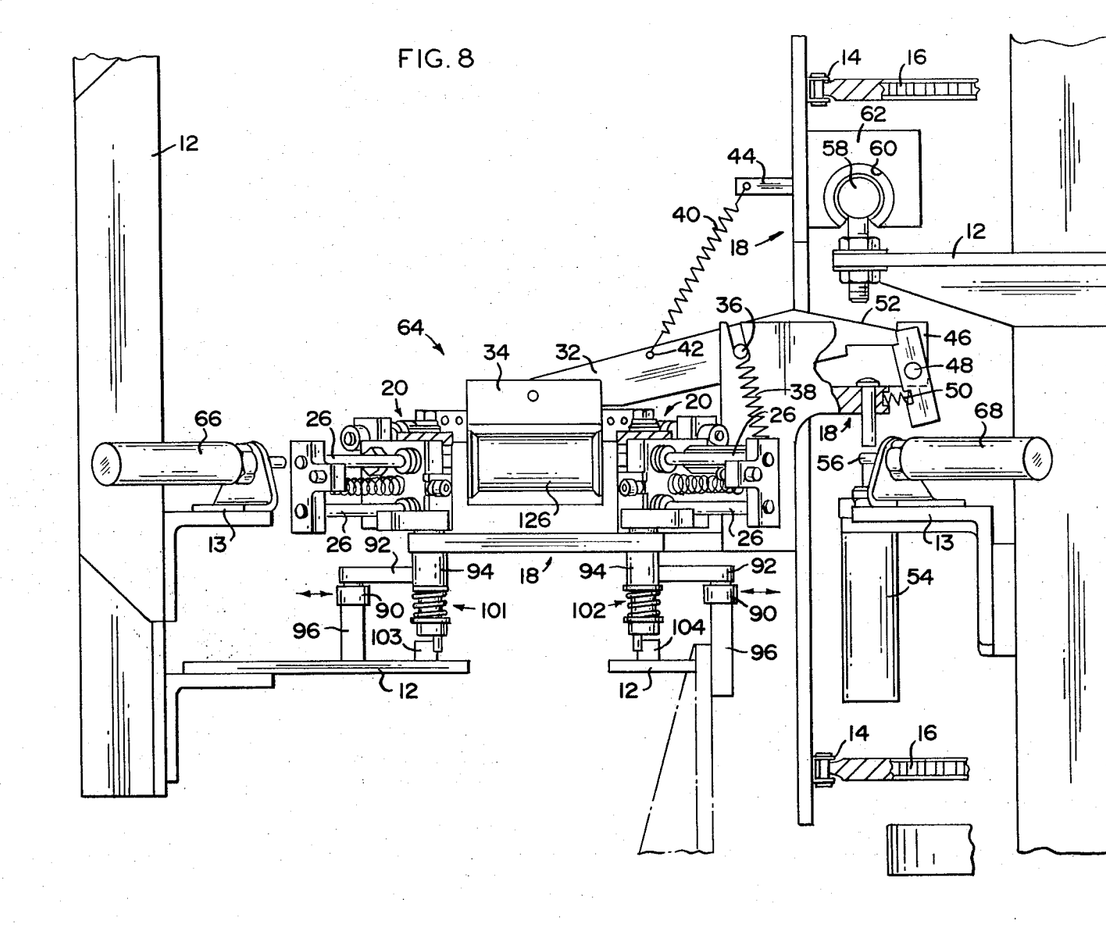
FIG. 8 is an end view of the carriage structure positioned at the forming station and includes the reciprocating means associated with the arms of the forming head and also the first and second cam follower means and cam means positioned relative to one another for desired operation.
Figure 11:
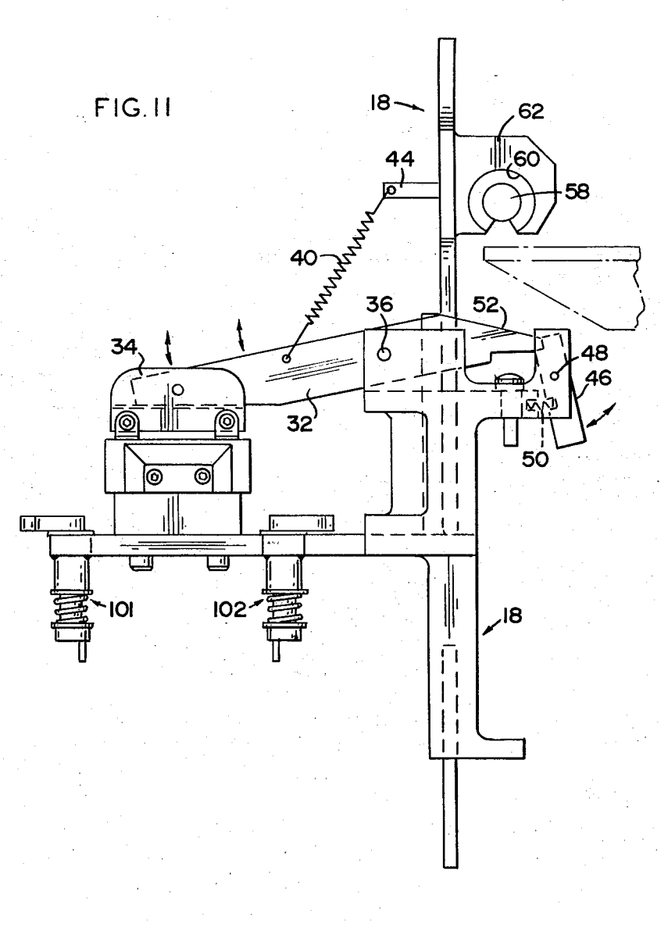
FIG. 11 is a broken away view of the carriage structure showing the clamping means in detail.

With further reference to FIGS. 8 and 11 carriage 18 travels along conveyor 14 by means of a rail and groove arrangement comprising a rail means 58 extending along at least a portion of the conveyor path and designed to be housed within rearward channel 60 wherein channel 60 is formed within support block 62 rigidly attached to a portion of the carriage 18.

Figure 3:
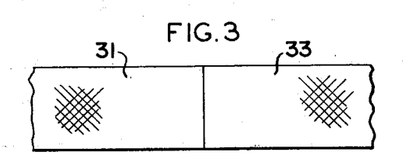
Figure 5:
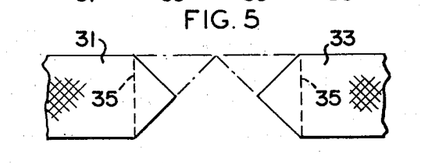
Figure 7:
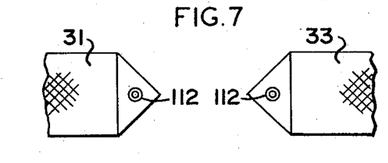
Figure 14:
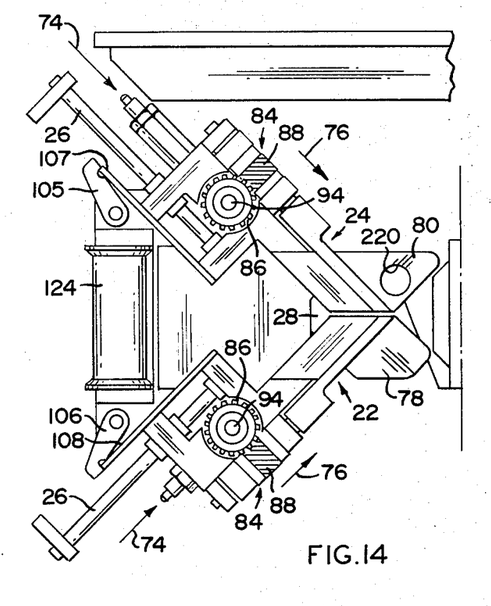
FIG. 14 is a top plan view in detail of the angularly oriented arms which comprise the forming head.
Figure 15:
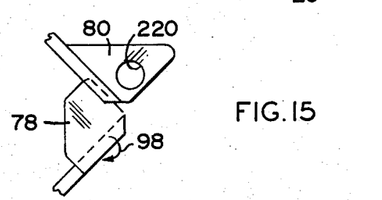
FIGS. 15–17 are broken away views of the end of the reciprocating arm of the forming head showing web forming members in place and their sequence of operation relative to one another.
Figure 16:
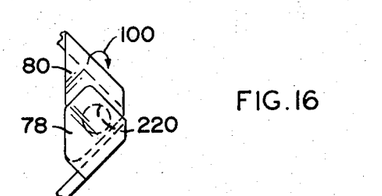
Figure 17:
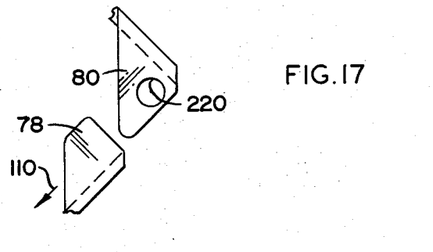
Figure 18:
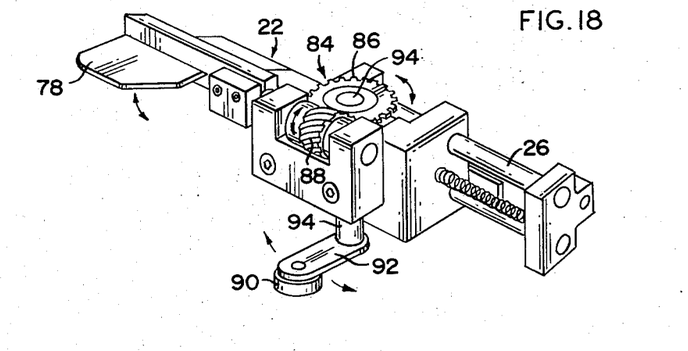
FIG. 18 is a detailed view of the arm structure comprising forming heads.

As explained above, each of the arms 22 and 24 of each forming head moves both in a reciprocal and rotated motion. More specifically FIG. 8 shows an end view of the first portion of the forming station generally indicated as 64 which includes a plurality of extendible and retractable piston and cylinder assemblies 66, 68, 70 and 72. Each of these assemblies are securely mounted on frame 12 by an appropriately located ledge or the like 13 and positioned to engage the outer end of each of the arms 22 and 24 on each of the heads 20. When these cylinder assemblies 66–72 are activated the plungers associated therewith engage the outer end of the arms and thereby extend them inwardly such that the inner end or extremity of each arm is brought into operative engagement with a predetermined web portion 30. This action is illustrated particularly in FIG. 14 wherein directional arrows 74 indicate the direction which the various plungers of the cylinder assemblies move. Similarly this inward direction causes the arms 22 and 24 to move in the direction indicated by arrow 76 thereby causing the extremities of these arms to overlap the web portion 30 and be latched in position by latch 105, 106. It is particularly important to note that a forming member in the form of a wing or the like 78 and 80 is attached to the extremity of arms 22 and 24 respectively. These members 78 and 80 are particularly configured to substantially correspond to the configuration of a corner portion 35 (FIG. 4) of a web portion being formed. With specific relation to FIGS. 2 and 3, the web 30 is initially positioned on the carriage 18 in an unsevered position as shown in FIG. 2. After this web portion 30 passes by the cutoff station 82 (FIG. 1) the web portion 30 is severed into two separated portions 31 and 33. (FIG. 3). Before the web portion is severed the reciprocating means which, as stated above, comprises piston and cylinder assemblies 66–72 are activated to extend the arms 22 and 24 and forming member 78 and 80 into operative position over the web 30. After being so positioned, the rotating means is activated so as to form web portion ends 31 and 33. This formation will be explained in detail hereinafter with specific references to FIGS. 4–7 and FIGS. 15–17. The rotation means comprises a gear assembly generally indicated as 84 and comprising a pinion gear 86 and a helical gear 88. This gear assembly 84 is interconnected between the various arms 22 and 24 and a first cam follower means (FIG. 8) comprising cam follower 90 and lever 92. Lever 92 is attached to shaft in such a manner as to cause its rotation, and thereby the rotation of pinion gear 86. This rotation occurs by cam follower 90 engaging cam 96 fixedly attached to the supporting frame and not being movable along with carriage 18. The rotation of pinion gear 86 of course in turn causes rotation of helical gear 88 which causes rotation of arm 22 relative to the longitudinal axis of that arm. This rotation and the interaction between forming members 78 and 80 with the web portion ends 31 and 32 (FIG. 3) is clearly seen with regard to FIGS. 15–17 and FIGS. 4–7 respectively. More particularly, when the first cam means 90 is associated with each of the arms 22 and 24 engage the first cam means 96, members 78 and 80 associated with respective arms rotate thereby causing the corner of web portion 31 and 33 to fold under the remaining portion of the web. This is clearly shown in FIGS. 4 and 5. With particular reference to FIG. 15 the first cam means 96 associated with each of the arms are so arranged on the support frame 12 that member 78 first rotates as indicated by directional arrow 98 (FIG. 15). Next, member 80 rotates as shown by directional arrow 100 to fold the opposite corner of web portion 31 and 33 so as to preform the ends of web portions 31 and 33 into the configuration shown in FIG. 5. When the member 78 and 80 are in overlapping relation, and the folds are in place, members 78 and arm 22 are caused to return to their non-extended inoperable position. This occurs by virtue of a second cam follower means generally indicated at 102 becoming disengaged from a second cam means 104. This causes rotation of latch member 106 out of locking engagement with latch finger 108 as shown in FIG. 14. The return of arm 22 and member 78 is indicated by directional arrow 110 (FIG. 17). Member 80 on the other hand, remains in overlapping engaging position to both the folds and is not returned to its extended position in that extended cam follower means 101 is maintained in engagement with second cam means 103. Accordingly latch 105 is maintained in engagement with finger 107 thereby maintaining arm 24 in the extended position. Again, the return and rotation of arms 22 and 24 and members 78 and 80 are determined by the relative position of the first and second cam follower means relative to the position of the first and second cam means as described above. It is readily seen that member 80 is maintained in fold retaining position (FIG. 17) so as to maintain the ends of web portions 31 and 33 in the preform position until these respective ends reaches the fastening station. The structure comprising the fastening means will be described in detail hereinafter but it is sufficient to note at this point that fasteners 112 are placed in such a position so as to permanently maintain the corners in the preformed, folded position shown in FIGS. 6 and 7.

Figure 9:
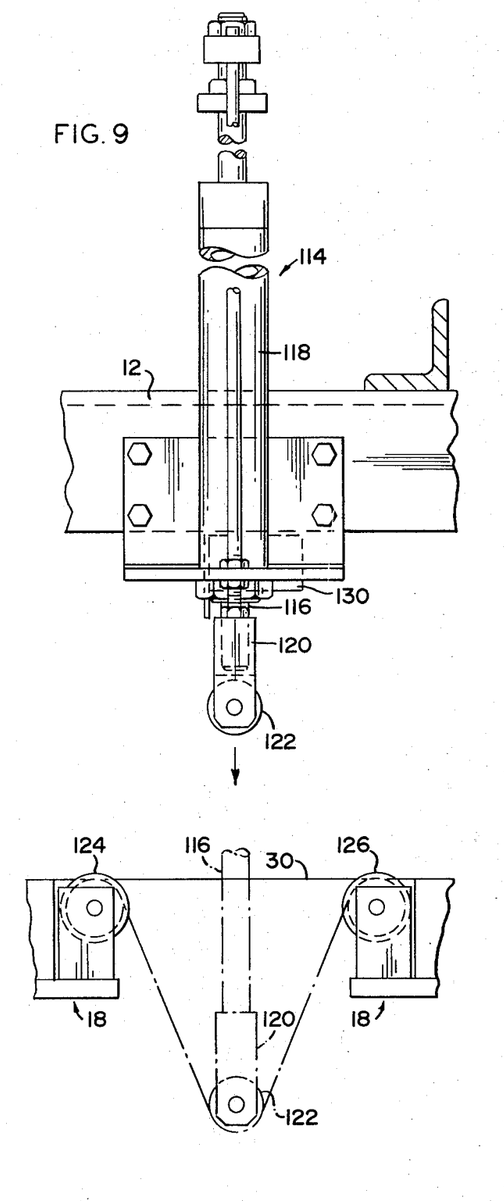
FIG. 9 is an end view of the feed means of the present invention.
Figure 10:
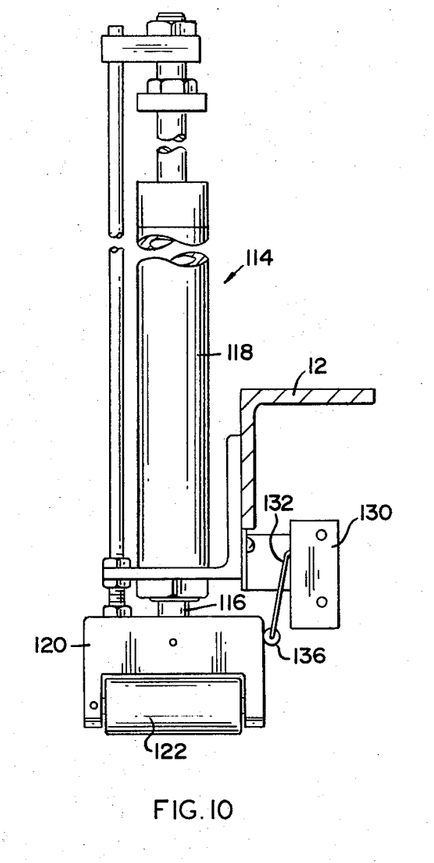
FIG. 10 is a front view of the feed means as shown in FIG. 9.

With particular reference to FIGS. 9 and 10, a feeding station is included as one of the plurality of work stations which define the work line along which the web 40 is formed. In particular the feeding station comprises a metering means generally indicated at 114 which includes a plunger 116 reciprocally mounted in hydraulic cylinder 118. A plunger head 120 is attached to the free extremity of plunger 116 and has included thereon a roller means rotatably mounted on head 120. This feeding station is securely mounted on frame 12 in adjacent relation to and communication with the path of travel of web 30. When activated, plunger 116 is depressed to intersect the plane of travel of web 30 thereby forcing web 30 downwardly between cooperatively positioned rollers or guide means 124 and 126 which are attached to the opposite end of adjacently positioned carriages 18. (FIG. 9). Movement of the web occurs relative to guide means 126 but is affixed relative to guide means 124. This is due to the fact that clamping means associated with the carriage on which guide means 124 is mounted is positioned in web securing relation to that carriage. Oppositely, the clamping means associated with the carriage on which guide means 126 is mounted is not in web securing position thereby allowing the web 30 to be fed off of supply roll 15 (FIG. 1) in a direction corresponding to directional arrow 17. It should be noted that the extension or degree of travel of plunger 116 is variable so as to allow various lengths of web 30 to be fed off of supply roll 15. A control means in the form of electrical switch 130 is associated with the movement of head 120 by means of arm and abutting members 132 and 134 respectively. This control switch regulates the clamping means associated with each of the adjacently located carriages 18 in order that the clamping means of the appropriately located adjacent carriages may be secured or unsecured so as to allow the feed of web 30 off of roll 15 in the proper direction.

Figure 12:
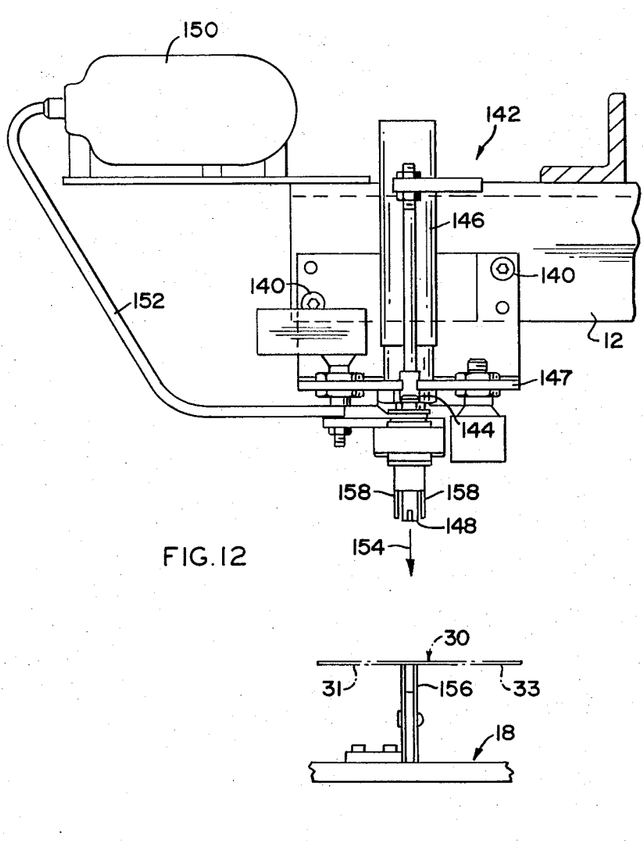
FIG. 12 is a front view of the cutoff station showing the heated cutting means and its relation to the web being severed.

FIG. 12 discloses a cutoff station which is included as one of the plurality of work stations. This cutoff station is located adjacent to the work line defined by the path of travel of the carriages 18 as previously described. The adjacent location is due to the fact that it is connected to corresponding portion of frame 12 by virtue of any applicable connecting means 140. With reference to FIG. 1 the cutting station is located generally at 81 and includes (FIG. 12) a cutoff means generally indicated as 142. This cutoff means comprises a plunger and cylinder arrangement 144 and 146 respectively. The cylinder 146 is securely mounted to L-shaped flange 148 which again secures the entire assembly to supporting frame 12. The cutoff head comprises a heated element 148 which may be in any applicable configuration and may include a resistance-type heating element powered from generator 150 and interconnected to the heated element by conduit means 152.

In operation, the plunger 144 and heated element 148 extends downward as shown by directional arrow 154 into engagement with web 30 until element 148 reaches upwardly extending flange 156 permanently attached to carriage 18 and aligned with heating element 148 as shown. Upon contact of element 148 with the portion of the web 130 immediately above flange 156, this area melts and the web is thereby severed into portions 31 and 33 as discussed with reference to FIGS. 3–7. While it has been recognized that heat is the most efficient means of cutting the synthetic material web, it should be noted that other types of cutting devices could be utilized. However, when heating element 48 is used heat shields 158 are located immediately adjacent to and in partially enclosing relation to the element 148. When element 148 is in actual contact with the web these heat shields 158 segregate the remaining portion of the web from this area so as to isolate any excess heat from the remaining portions 31 and 33 thereby preventing heat damage to these portions. Heat is thereby restricted to only the area sandwiched between flange 156 and the lower surface of element 148.

Figure 19:
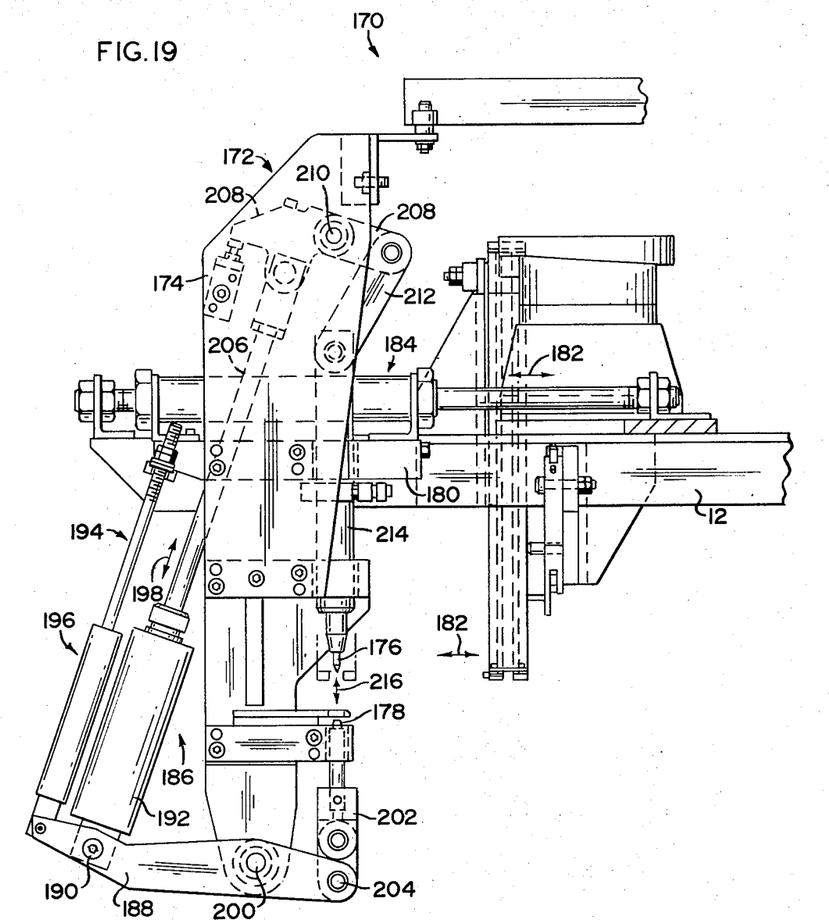
FIG. 19 is a front view of the fastener means and its relationship to the work line or conveyor mounted adjacent thereto.

FIG. 19 discloses the fastening station which comprises one of the working stations along the path of travel of the carriages 18. More particularly, the fastening station is generally indicated as 170 (FIGS. 1 and 19) and includes a fastening means 172. The fastening means includes a support frame 174 having mounted thereon anvil 176 and stirrup means 178 which comprises the riveting or stapling portion of the fastening means. The frame 174 is securely mounted on platform 180 which in turn is reciprocally mounted so as to position the fastening means 172 into and out of the path of travel of the carriages and the web being formed and carried thereby. The reciprocal movement is indicated by directional arrow 182 and is caused by activation of the piston and cylinder assembly 184. Cylinder assembly 184 can be any conventional hydraulic or pneumatic type arrangement and as shown in FIG. 19 causes the transverse movement of the entire fastening means including the frame 174 and platform 180 across the path of carriages 18 and relative to the frame portion 12. The relative movement between anvil 176 and stirrup 178 so as to fasten together web portion 35 in the configurations shown in FIG. 6 and 7 occurs by an additional hydraulic or pneumatic piston and cylinder arrangement generally indicated as 186. As clearly shown in FIG. 19 pivot link 188 is movably attached at point 190 to cylinder 192. A spring loaded tie rod arrangement generally indicated as 196 is arranged in substantially parallel relation to a portion of the piston and cylinder assembly 186 when the anvil and stirrup members are in their opened position. Reciprocal movement of this assembly is indicated by directional arrow 198. Extension or retraction of assembly 186 causes link 188 to pivot about fulcrum point 200. This rotational action of link 188 causes vertical movement of stirrup support means 202 due to a pivotal connection 204 at its lower extremity as shown in FIG. 19. Stirrup 178 may stay in its lower retracted position until anvil 176 moves through its downward stroke.

The upper end of piston 206 is movably connected to a second pivotal link 208 which is rotatably mounted on frame 174 at fulcrum 210. Link 212 interconnects one extremity of member 208 to the anvil support shaft 214. Accordingly, upon activation of cylinder assembly 186 both support members 202 and 214 cause a vertical movement of anvil 176 and stirrup 178 as shown by directional arrow 216. At least one fastening means may be positioned in operative relation to each forming head on the carriages at the fastening station.

As briefly explained above, web forming portion 80 includes aperture 220 which, after forming the web portions in the desired folded configuration remains in the orientation shown in FIG. 17. In this orientation member 180 holds the corner or web portions in the desired position until they are operatively positioned relative to anvil 176 and stirrup 178. Upon activation of the cylinder assembly 186 the anvil 176 penetrates the web portion causing a rivet or like fastening means to securely engage both preformed web portions thereby maintaining the formed web in the configuration shown in FIGS. 6 and 7. The fastening means 112 may be any conventional type eyelet or staple means.

It will thus be seen that the objects made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Now that the invention has been described, what is claimed is:

1. A web forming machine comprising: a conveyor means movably mounted on a supporting frame, a plurality of carriages connected to said conveyor means so as to move therewith relative to said frame, a plurality of work stations positioned in predetermined spaced relation to one another adjacent to and in communication with the path of travel of said carriages, driving means connected to said conveyor so as to move said conveyor at a predetermined rate such that said carriages are positioned in communicating relation to each of said plurality of work stations for a predetermined period, at least one of said plurality of carriages comprising at least one web forming head mounted on said carriage and including a pair of arms reciprocally mounted on said carriage and disposed in spaced relation to one another, arm rotating means operatively connected to each of said arms, each of said arms disposed on said carriage in web engaging position and movable in both a reciprocal and rotational manner relative to the longitudinal axis of said respective arm.

2. A machine as in claim 1 wherein at least one of said plurality of work stations comprises a feed station, said feed station positioned adjacent to the path of travel of said carriages and being fixed relative to said plurality of carriages, said feed station comprising a metering means movable into engagement with said web positioned adjacent to said feed station; clamp means arranged in working relation to each of said plurality of carriages so as to maintain said web in fixed relation to an associated carriage when in clamp engaging position therewith, said metering means operatively engaging said web when said clamping means associated with at least one adjacently located carriage in web clamping engagement therewith.

3. A machine as in claim 2 wherein said metering means comprises a plunger means positioned to engage said web when extended into intersecting relation to the normal path of travel of said web, the distance of extension of said plunger means relative to said path of travel being variable, whereby the amount of web fed from a web supply may be variable.

4. A machine as in claim 1 wherein at least one of said plurality of work stations comprises a fastening station said fastening station including fastening means mounted in communicating relation to said web, said fastening station located down line of said work station which comprises a forming station, whereby the web portion being fastened is arranged in a desired configuration.

5. A machine as in claim 4 wherein said fastening means is movable mounted relative to the path of travel of said plurality of carriages, positioning means connected to said fastening means so as to move it into and out of web engaging position.

6. A machine as in claim 1 wherein said conveyor means is moved intermittently at predetermined intervals by cooperation with said driving means, such that each of said carriages is positioned in cooperative relation to each of said plurality of work stations for a predetermined period, said predetermined intervals being dependent upon the spaced distance of said work stations relative to one another.

7. A machine as in claim 1 wherein said plurality of work stations include a first set of stations positioned in predetermined spaced relation to one another and adjacent to the path of travel of said carriages to define a first work line for the forming of said web.

8. A machine as in claim 7 wherein said plurality of work stations include a second set of stations positioned in predetermined spaced relation to the stations of said second set and adjacent to the path of travel of said carriages so as to define a second work line, said conveyor traveling in a continuous path, whereby said carriages pass along said first and second work lines in substantially opposite directions relative to said supporting frame.

9. A machine as in claim 1 wherein at least one of said plurality of work stations comprises a cutoff station positioned adjacent to the path of travel of the web, said cutoff station comprising a cutting means arranged to engage the web.

10. A machine as in claim 9 wherein said cutting means comprises a heated element movable into engagement with the web, said heated element being maintained at a temperature sufficient to sever the web at the area of contact, said cutoff station further comprising heat shield means mounted adjacent to said heated element and positionable in heat isolating position between the area of contact of said element and the remainder of the web.

11. A machine as in claim 1 wherein said one carriage comprises at least one web forming head mounted on said carriage and including a pair of arms arranged in spaced cooperative relation to one another, clamp means mounted on said carriage in communicating relation to a web portion associated therewith, said clamp means movable into and out of web securing engagement with the web portion such that the web may be secured in operative position to said carriage.

12. A machine as in claim 11 wherein said arms are reciprocally mounted on said carriage and angularly arranged relative to one another such that corresponding ends of each arm are arranged in web engaging position when in extended position, a support means mounted on said carriage adjacent to the web engaging position and said corresponding ends of said arms whereby forming of said web occurs through cooperation of said ends and said support means.

13. A machine as in claim 11 wherein said one carriage comprises two web forming heads arranged in opposed spaced relation to one another and positioned in substantially aligned, web engaging relation to one another along the path of said web being worked on, whereby adjacent portions of said web are simultaneously worked on by said two heads.

14. A machine as in claim 11 wherein each arm on said one carriage comprises a web engaging member mounted thereon, said member configured to correspond to a predetermined portion of the web, whereby engagement of said member with said portion forms the web into a desired configuration.

15. A machine as claim 14 wherein each of said rotatably mounted arms includes said web engaging member positioned on said arm so as to fold the web portion underneath the remainder of the adjacently positioned web.

16. A machine as in claim 1 wherein said arm rotating means comprises a gear assembly connected to each of said arms, a first cam follower means connected to said gear assembly of each arm and positioned to cooperate with a first cam means, whereby engagement between said first cam follower means and said first cam means cooperating with each arm causes rotation of said arm by activating said gear assembly, said first cam means mounted on said supporting frame in predetermined position such that engagement of said cam follower means on each of said arms and the corresponding first cam means occurs successively thereby causing successive rotation of each arm.

17. A machine as in claim 16 wherein said first cam follower means is positioned on said frame at one of said plurality of work stations comprising a forming station, said one forming station further including arm reciprocating means mounted on said frame for operative engagement with said arms of said one carriage when positioned at said forming station, whereby said arms are forced to and outwardly extended position upon engagement with said reciprocating means.

18. A machine as in claim 17 wherein said reciprocating means comprises a plurality of pistons and cylinder assemblies, each of said plurality of assemblies arranged to operatively engage at least one of said arms on a correspondingly positioned one carriage.

19. A machine as in claim 17 wherein said one forming station further comprises a second cam means mounted on said frame in operative engagement with a second cam follower means connected to each of said arms in a corresponding position carriage, whereby engagement between said respective second cam means and said second cam follower means regulates the movement of an arm associated therewith, said second cam means configured to disengage correspondingly positioned second cam follower means successively such that each of said arms comprising a head are successively removed from working engagement with the web.

20. A machine as in claim 19 wherein said first and second cam means are positioned on said frame relative to one another and relative to said first and second cam follower means respectively such that rotational and reciprocating motion of each arm occurs at predetermined times and at predetermined successive stages.

References Cited

UNITED STATES PATENTS

| | | | |
|---|---|---|---|
| 3,465,867 | 9/1969 | Gartner et al. | 198—19 |
| 2,880,896 | 4/1959 | Key et al. | 198—179 X |
| 2,828,796 | 4/1958 | Loew | 156—478 X |
| 3,269,524 | 8/1966 | Cainfield | 198—180 |
| 3,045,742 | 7/1962 | Brooks et al. | 156—463 |
| 3,575,763 | 4/1971 | Ramsey | 156—251 |
| 2,207,914 | 7/1940 | Dalton | 198—19 |
| 3,168,429 | 2/1965 | Hackl | 156—492 |
| 3,491,926 | 1/1970 | Tucci | 223—38 |
| 1,870,348 | 8/1932 | Sieb | 156—556 |
| 2,793,733 | 5/1957 | Karagforgieff | 198—19 |

ALFRED L. LEAVITT, Primary Examiner

D. A. SIMMONS, Assistant Examiner

U.S. Cl. X.R.

156—478, 492, 539, 543; 198—19; 223—38